Sept. 12, 1961 H. J. G. SCHADE 2,999,598
SIEVE STRUCTURES
Filed March 6, 1958 5 Sheets-Sheet 1
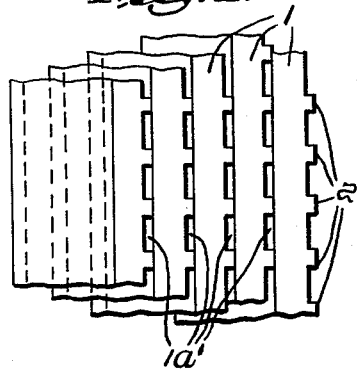
Inventor:
Harald Joachim Georg Schade
by
Attorney

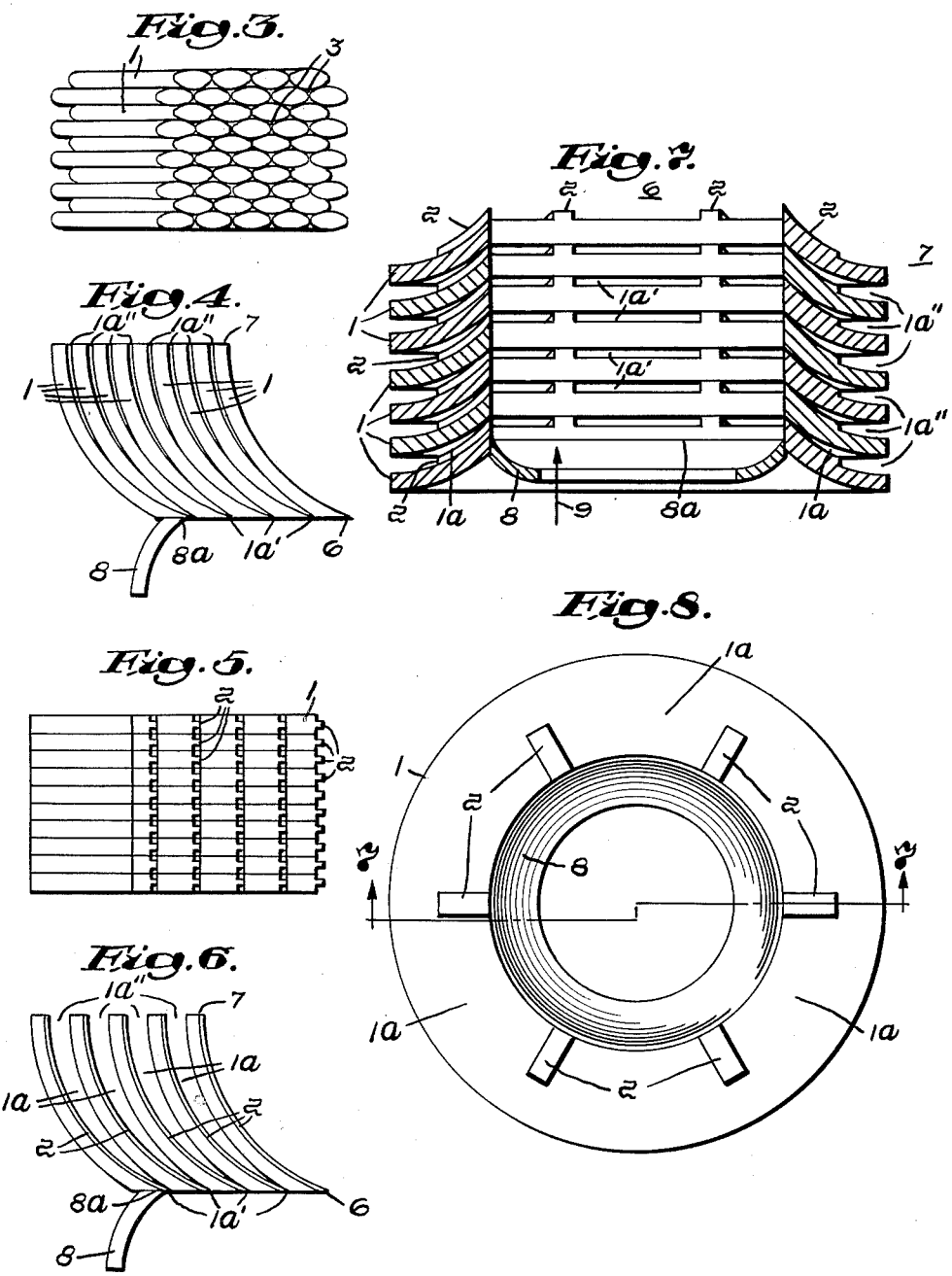

Sept. 12, 1961  H. J. G. SCHADE  2,999,598
SIEVE STRUCTURES
Filed March 6, 1958  5 Sheets-Sheet 3

Inventor:
Harald Joachim Georg Schade
by
Attorney

Sept. 12, 1961  H. J. G. SCHADE  2,999,598
SIEVE STRUCTURES
Filed March 6, 1958  5 Sheets-Sheet 4
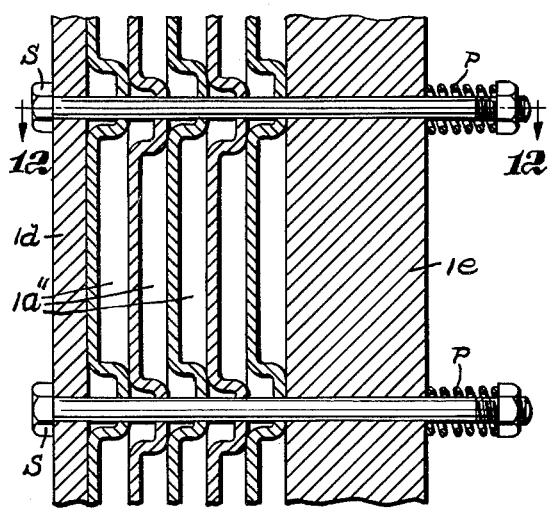
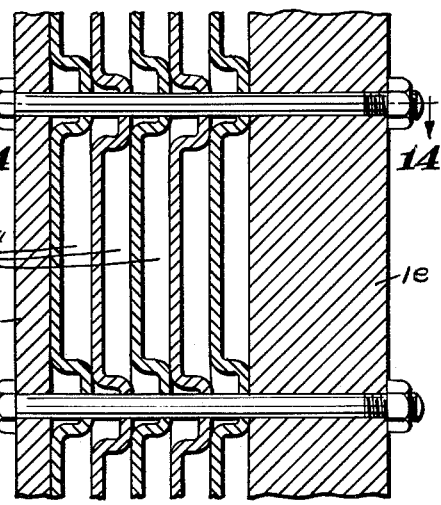
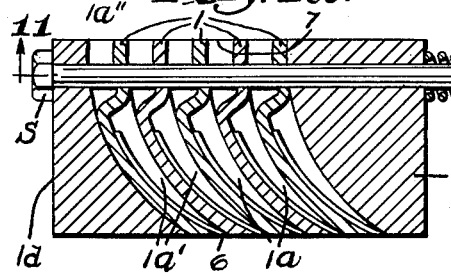
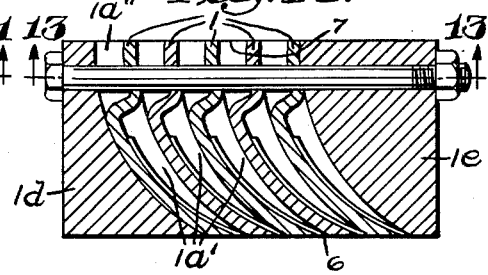
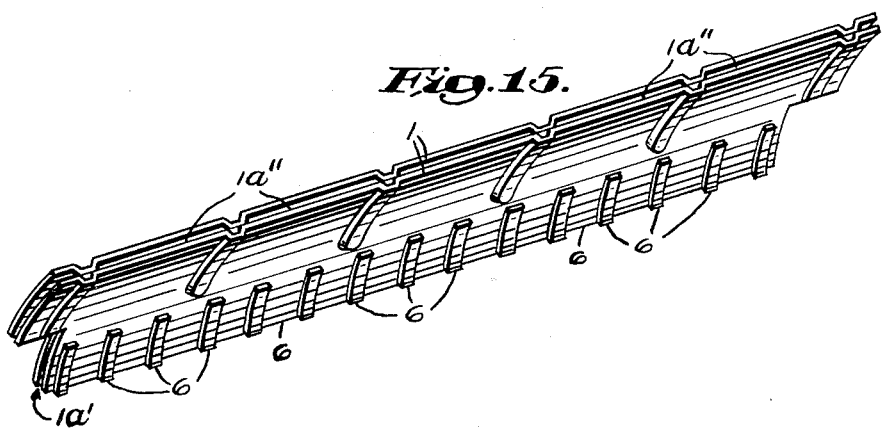
Inventor:
Harald Joachim Georg Schade
by [signature]
Attorney Sept. 12, 1961  H. J. G. SCHADE  2,999,598
SIEVE STRUCTURES
Filed March 6, 1958  5 Sheets-Sheet 5
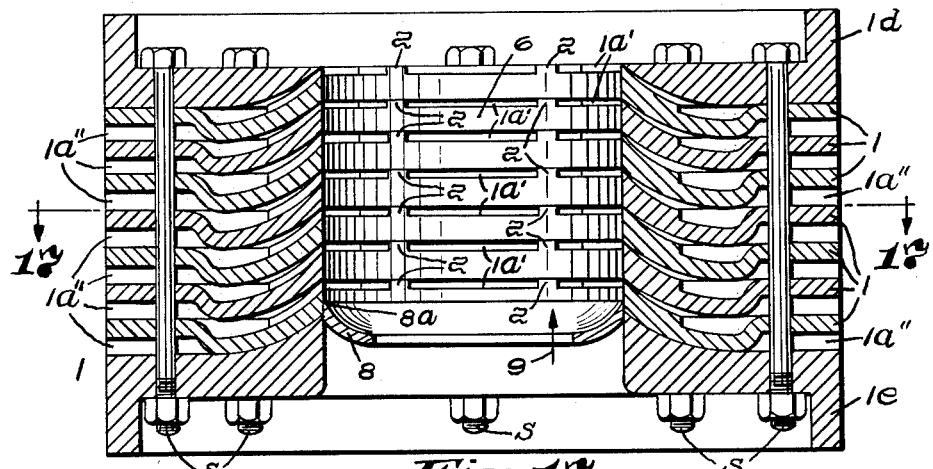
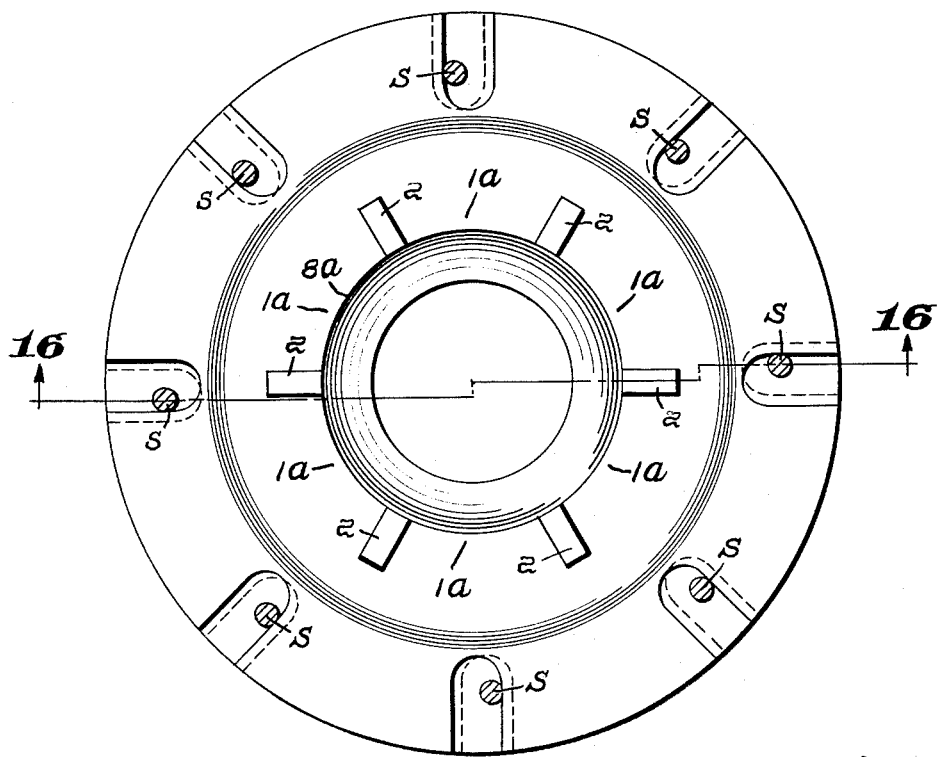

United States Patent Office 2,999,598
Patented Sept. 12, 1961

2,999,598
SIEVE STRUCTURES
Harald Joachim Georg Schade, Karlsbaderstrasse, Michelbach, Nassau, Germany
Filed Mar. 6, 1958, Ser. No. 719,522
10 Claims. (Cl. 210—488)

This invention has reference to sieves, or filters, for removing foreign matter, i.e., solid matter, from fluid media, particularly from liquid media.

It is a general object of this invention to provide improved sieves or filters of this character.

Another object of this invention is to provide sieves or filters adapted for removing relatively coarse or bulky as well as relatively fine or small particles from a body of flowing liquid.

Another object of the invention is to provide filters that lend themselves to be assembled of relatively small elements and form filter units of very large size as required for use in water purification systems, waste disposal systems, chemical plants, et cetera.

It is a special object of this invention to provide improved sieves or filters which are substantially in the form of laminations stacked in spaced relation and have a large number of narrow gaps between constituent laminations.

Sieves or filters of this description which were known heretofore are subject to a large number of limitations or drawbacks.

It is, therefore, another object of this invention to provide sieves or filters of this description not subject to the limitations and/or drawbacks of the prior art structures.

Another object of the invention is to provide filters which lend themselves to minimizing the width of the gaps formed at the inlet-side between the edges of contiguous laminations, thus achieving removal of particles of very small size.

Prior art filters made up of spaced laminations in stack-form have a relatively limited dimensional stability and are very difficult to clean, particularly if the inlet openings thereof are narrow.

It is, therefore, a special object of this invention to provide sieves or filters which are not subject to these limitations.

Further objects, advantages and characteristic features of the invention will become more apparent as the following description proceeds, and the features of novelty characterising the invention will be pointed out with particularity in the claims annexed to, and forming part of, this specification.

For a better understanding of the invention reference may be had to the accompanying drawings in which:

FIG. 1 shows in front elevation a portion of a sieve structure embodying this invention;

FIG. 1a is an isometric view of a pair of the elements of which the structure of FIG. 1 is made up;

FIG. 2 is a top plan view of the structure shown in FIG. 1, including a flushing nozzle which is shown in cross-section and also including a scraper mechanism omitted in FIG. 1;

FIG. 3 shows in front elevation a portion of another sieve structure embodying this invention;

FIG 4 is a top plan view of the structure shown in FIG. 3 including a scraper mechanism omitted in FIG. 3;

FIG. 5 shows in front elevation a portion of still another sieve structure embodying this invention;

FIG. 6 is a top plan view of the structure of FIG. 5 including a scraper mechanism omitted in FIG. 5;

FIG. 7 is a section taken along 7—7 of FIG. 8 and illustrates a generally toroidally shaped sieve or filter embodying this invention;

FIG. 8 is a top plan view of the structure of FIG. 7;

FIG. 11 illustrates another embodiment of the invention showing the same sectioned along 11—11 of FIG. 12;

FIG. 12 is a section taken along 12—12 of FIG. 11;

FIG. 13 illustrates still another embodiment of the invention and is a section taken along 13—13 of FIG. 14;

FIG. 14 is a section taken along 14—14 of FIG. 13;

FIG. 15 is an isometric view of one of the constituent elements of the structure of FIGS. 13 and 14;

Figure 9:
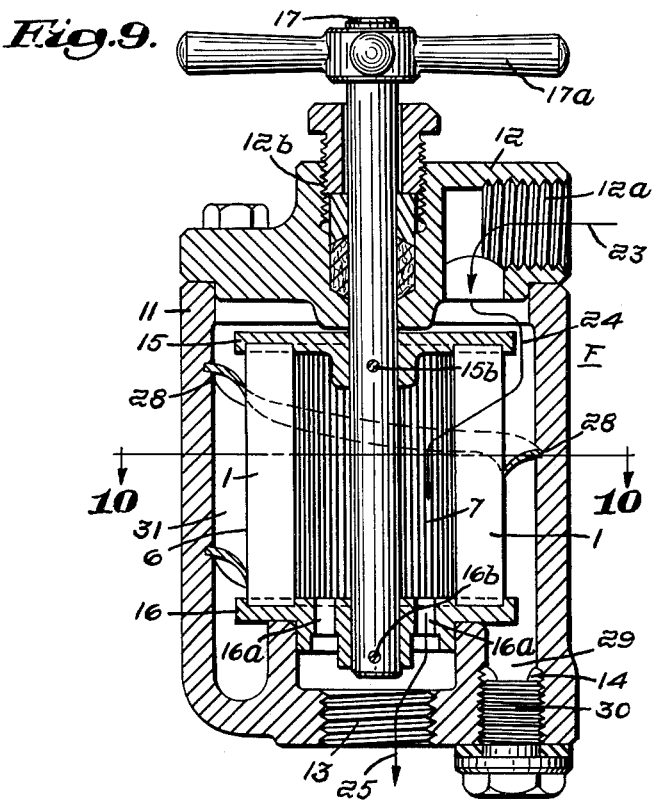
FIG. 9 is a vertical section illustrating another generally toroidally shaped sieve or filter embodying this invention taken along 9—9 of FIG. 10.

FIG. 16 is a section taken along 16—16 of FIG. 17 and shows a toroidal sieve or filted similar to that shown in FIGS. 7 and 8; and FIG. 17 is a section along 17—17 of FIG. 16.

Referring now to the drawings, and more particularly to FIGS. 1 to 2 thereof, numeral 1 has been applied to indicate a plurality of bent metal sheets stacked in fixed spaced relation and forming gaps or passages 1a therebetween for the flow of a fluid to be purified. Sheet metal elements 1 are provided with spacing ribs 2 which determine the spacing between contiguous elements 1, and which impart a high degree of dimensional stability to the sieve or filter structure. Spacing ribs 2 form integral parts of sieve elements 1. These ribs 2 may project from the convex side of elements 1, or from the concave side thereof, as desired. Reference numeral 1a' has been applied to indicate the entrance or inlet slots of passages 1a, and reference numeral 1a" has been applied to indicate the outlet openings thereof. All inlets 1a' are situated in the common plane 6 and all outlets are situated in the common plane 7. Planes 6 and 7 are parallel. Numeral 5 has been applied to indicate the spacing of planes 6 and 7.

A sieve or filter as shown in FIGS. 1 and 2 must be associated with means for admitting fluid to it and with means for removing, or draining, the purified fluid from it. Such means have been indicated diagrammatically in FIG. 2 by channel walls W. Channel walls W bound and direct a flow of fluid or liquid in a general or main direction indicated by the arrow 4. Arrow 4 is at right angles to inlet plane 6. The angle enclosed between the inlet ends of plates 1 and the main direction of the flow of fluid is the obtuse angle $\alpha$. In other words, the angle $\alpha$ is the angle enclosed between the direction 4 of flow and a plane which forms a tangent to curved plates of blades 1 at the inlet end or upstream end thereof. The outlet ends, or downstream ends, of plates or blades 1 are substantially parallel to the main direction 4 of fluid flow.

Foreign matter, i.e. matter to be removed by straining or filtration is retained in the plane 6 of the structure where the cross-sectional area of the fluid passages is smallest. The velocity of the fluid is largest and its pressure is smallest in the zone of the narrow inlet gaps 1a'. There is a build-up of pressure toward the outlet gaps 1a". Very small particles of foreign matter not retained in the inlet plane 6 but escaping through inlets 1a' toward outlets 1a" cannot attach themselves to passages 1a at any point or points thereof. Thus clogging of the passages 1a is effectively precluded.

The entrance or inlet plane 6 of the sieve structure should be a smooth surface. This can be achieved by finely grinding this surface after elements or blades 1 have been assembled in stack-form and joined together to form a unitary self-sustained structure, as will be described below more in detail.

Solid matter which has been retained in front of plane 6 may be removed by a scraper 8 which is substantially sickle-shaped in cross-section. Scraper 8 is movable in the direction of arrow 9. It has a scraping edge increment 8a which is in physical engagement with the inlet plane 6, and encloses the acute angle $-\beta$ with said plane. The inlet ends of blades or laminations 1 are preferably relatively resilient, and the angle enclosed between the aforementioned scraping edge increment 8a of scraper 8 and the inlet ends of blades or laminations 1 is relatively small, thus causing scraping edge increment 8a to closely hug the front surface 6 of the sieve or filter structure. This assures an intimate engagement of parts 1 and 8 as the scraper is caused to perform its duty. Filaments and other fibrous materials which have entered into, but not passed through, the inlets 1a' are seized by the scraper 8 as it passes along surface 1 and pulled out of the sieve structure.

Where the sieve is substantially in the shape of a porous wall extending transversely across a flow of fluid, the edge of the scraper should be slanting rather than parallel to the edges of the constituent laminations of the sieve. Another structure comprising a scraper having a slanting scraping edge has been illustrated in FIGS. 9 and 10 and is described below in detail.

In some instances the action of scraper 8 may not be sufficient. In such instances the action of scraper 8 may be supplemented, or substituted, by the action of flushing means establishing a back-flow of flushing medium such as, for instance, water. In FIG. 2 reference letter N has been applied to a flushing nozzle diagrammatically indicating the possible arrangement of flushing means for removing solid particles or other foreign matter from the sieve structure. The jet issuing from nozzle N or from a plurality of such nozzles causes opening or widening of the relatively resilient inlet ends of passages 1a, resulting in a thorough removal of foreign matter therefrom. To cause the inlet ends of passages 1a to spread readily blades 1 are preferably not uniformly resilient; thus their inlet ends deform readily during flushing when the direction of fluid flow is reversed.

It will be apparent from the foregoing that the sieve structure shown in FIGS. 1 and 2 lends itself to the removal of relatively bulky or large foreign matter as well as to the removal of particles of relatively small size. The height of spacing ribs 2 may be relatively small, or relatively large, and this imparts a high degree of flexibility, or a wide gamut of operating characteristics, to the structure shown and described.

The geometry of the structure of FIGS. 1 and 2 may also be described without having reference to the main or general direction 4 of fluid flow. As shown in FIG. 2, each element or lamination 1 encloses at the inlet-plane-end thereof an angle $\gamma$ with the inlet plane 6 different from the angle $\delta$ enclosed between the outlet-plane-end of each element or lamination 1 and the outlet-plane 7. The first mentioned angle $\gamma$ is smaller than the last mentioned angle $\delta$, and the last mentioned angle is virtually 90 degrees, the outlet increments of elements or laminations 1 and plane 7 being substantially at right angles.

The radius of curvature of each element or lamination 1 is relatively small in the area of the inlet-plane 6 and the radius of curvature of each element or lamination 1 is relatively large in the area of outlet-plane 7. The radius of curvature of successive increments of the planes defined by elements or laminations 1 increases from the inlet-end to the outlet-end thereof. In other words, the slant or inclination of the surfaces defined by elements or laminations 1 increases from the inlet or upstream end to the outlet or downstream end thereof.

Structures of the general character shown in FIGS. 1–2 are applicable wherever the inlet surface is a developable surface such as, for instance, a cylindrical surface. Applications of the design principles shown in FIGS. 1–2 to sieves or filters requiring cylindrical inlet surfaces and cylindrical outlet surfaces are illustrated in FIGS. 7–10 and FIGS. 16 and 17. In some instances it is desirable to have inlet surfaces and/or outlet surfaces which are not developable surfaces, e.g. spherical surfaces. The structures shown in FIGS. 3–6 may be used to form sieves or filters having inlet surfaces and outlet surfaces of any desired shape, or geometry.

It will be apparent from FIG. 2 that laminations 1 are continuously curved or bent, i.e. that they are free from any discontinuity such as an abrupt change of rate of rise. Laminations 1 define passages 1a which are likewise continuously curved or bent, i.e. which are free from any discontinuity such as an abrupt change in cross-sectional area. This is important in order to achieve a substantially laminar flow of fluids through passages 1a, i.e. a flow of fluids involving a minimum of turbulence.

As clearly shown in FIG. 2 scraper 8 is more or less a mirror image of the inlet-plane-end of the adjacent filter lamination 1. In other words, the scraper blade 8 is shaped in such a fashion that each cross-section thereof taken along a section-plane at right angles to inlet plane 6 is generally symmetrical with respect to inlet-plane 6 to a cross-section taken along said section-plane of the nearest end of one of laminations 1. An example for such a section-plane is the plane of the paper on which FIG. 2 has been drawn. Other members of such a family of section-planes are any plane parallel to the plane of the paper on which FIG. 2 has been drawn.

The angle $-\beta$ is of the same order as the angle $\gamma$, this being a necessary result of the aforementioned condition of approximate symmetry of parts 1 and 8 in respect to plane 6. In other words, the angle $-\beta$ is substantially equal to 360° minus $\gamma$.

In the foregoing angles measured in clockwise direction have been deemed positive and angles measured in counterclockwise direction negative. Thus $$\gamma \cong -\beta$$

or $$\gamma + \beta \cong 0$$

The angle $-\beta$ expressed in terms of positive angles is an angle in excess of 270 degrees, which is apparent from FIG. 2.

The laminations 1 shown in FIG. 2 are bent from left to right and therefore the direction from left to right or the direction of arrow 9 may be referred to as the direction of the curvature of laminations 1.

When the scraper 8 shown in FIG. 2 is moved relative to the stack of laminations 1 in the direction of the curvature thereof, i.e. of the arrow 9, the scraper tends to pull or extricate foreign matter out of the inlet-plane ends of passages 1a rather than to merely shift foreign matter from one of the sides of the passages 1a and compressing it in the shifted position thereof.

The structure shown in FIGS. 3 and 4 comprises a plurality of curved rods 1' packed together to form a bundle. Rods 1 form curved passages therebetween which have relatively narrow entrances or inlets 1a' and relatively wide outlets 1a''. The inlets 1a' are situated in the common plane 6 and the outlets are situated in the common plane 7. Each rod 1 encloses at the inlet end thereof an acute angle with plane 6 and its outlet end is substantially at right angles to plane 7. The scraper 8 is arranged to move along plane 6 as described in connection with FIG. 2.

The sieve structure shown in FIGS. 5 and 6 is similar to that shown in FIGS. 3 and 4, and does not need to be described in detail, the same reference numerals having been applied in FIGS. 3–6, inclusive, to indicate like parts.

The sieve structure of FIGS. 5 and 6 differs mainly from that of FIGS. 3 and 4 by reason of the fact that the former is formed of curved rods, or profile wires, which are substantially rectangular in cross-section, whereas the latter is formed of curved rods, or profile wires, which are substantially oval in cross-section. In both instances each of the rods or profile wires 1 is provided with one single rib 2 for achieving the proper spacing between contiguous rods or wires, i.e. such a spacing that the transverse passages 1a formed have relatively small inlets 1a' and relatively large outlets 1a". The scale of FIGS. 3 and 4 is too small to clearly show the aforementioned spacing ribs but in FIGS. 5 and 6 these ribs have clearly been shown.

It will be noted that the structure shown in FIGS. 1 to 2 differs from those shown in FIGS. 3 to 6 inasmuch as in the former each of the elements, blades or laminations 1 is provided with a plurality of spacing ribs which are situated at different levels, whereas in the structures of FIGS. 3–6 each element 1 has but one single spacing rib 2. According to FIG. 1a each of the laminations 1 includes spacer rib means 2 forming an integral part thereof beginning at the inlet-plane-end of laminations 1 and extending to the outlet-plane thereof. There are additional spacer rib means—shown at the left of FIG. 1a—situated adjacent the outlet-plane. The number of the spacer rib means near the edges of laminations 1 defining the outlet-plane is smaller than the number of spacer rib means 2 near the edges of laminations 1 defining the inlet-plane.

The sieve structure of FIGS. 7 and 8 being a modification of that of FIGS. 1 and 2 for applications requiring toroidal filters, all what has been said in regard to FIGS. 1 and 2 applies generally also to FIGS. 7 and 8. As shown in FIGS. 7 and 8 the filter is made up of a plurality of circular coaxial disc-shaped elements 1 arranged in stack-form. Discs 1 have central openings 1b arranged in registry and defining a vertical passage extending in a direction longitudinally of the toroidal stack structure. Each disc 1 is provided with a spacing rib 2 forming an integral part thereof, causing discs 1 to define therebetween a plurality of radially outwardly extending passages 1a radially outwardly increasing in cross-sectional area. Juxtaposed surfaces of discs 1 are curved and have radii of curvature decreasing from the radially inner sides of discs 1 to the radially outer sides thereof.

It will be apparent from FIGS. 7 and 8 that the diameter of spacing ribs 2 is considerably less than the diameter of discs 1, as a result of which the six radially outwardly extending passages 1a which are formed at each level of the filter stack merge into a common radially outwardly extending passage in the region of the outer cylindrical surface 7 of the filter stack.

It will be noted that the left portion of FIG. 7 shows the spacing ribs 2 in front elevation, whereas the right portion of FIG. 7 shows the spacing ribs 2 in cross-section.

The cup-shaped scraper 8 is shown in its lowest position and adapted to be moved upwardly in the direction of arrow 9. The scraping edge increment 8a of scraper 8 is in physical engagement with the cylindrical surface 6 in which all the filter inlets 1a' are situated. All discs 1 are identical and the cup-shaped scraper 8 is shown in such a position that it obstructs, in part, to view the bottom disc 1 of the sieve or filter stack.

Filters as shown in FIGS. 7 and 8 are particularly intended to be used in centrifugal filtering machines which require a radially outer flow for the media to be purified.

Figure 10:
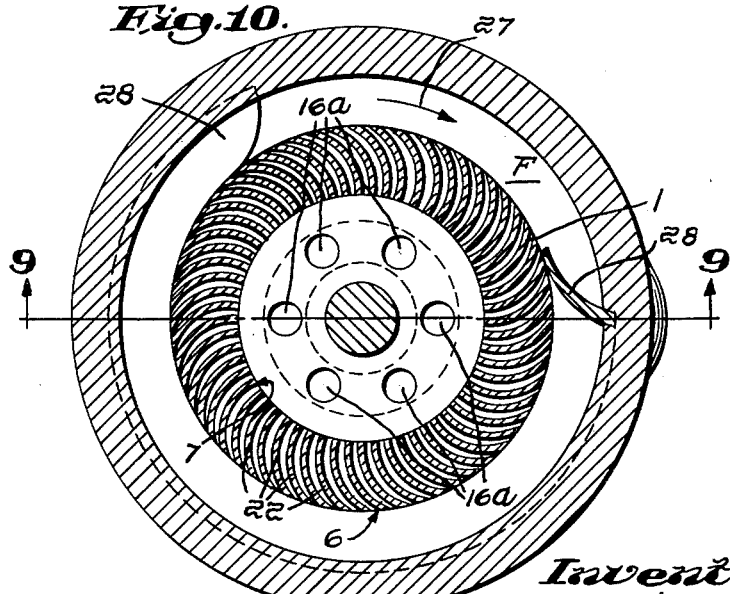
FIG. 10 is a section of the structure shown in FIG. 9 taken along 10—10 of FIG. 9.

Referring now to FIGS. 9 and 10, these figures show another kind of toroidal filter generally designated by reference character F. FIGS. 9 and 10 show also the parts or the hardware frequently associated with such a sieve or filter. The filter proper or filter insert F comprises a plurality of curved spaced blade elements 1 each having a radially inner edge situated in a cylindrical outlet surface 7 having a relatively small radius, and each blade element 1 has a radially outer edge situated in a cylindrical inlet-surface 6 having a relatively large radius. Blades 1 define a plurality of passages therebetween having relatively narrow inlets situated in plane 6, and having relatively wide outlets situated in plane 7. Each of blades 1 encloses at the inlet-end thereof an angle with the cylindrical surface 6 which is different from the angle enclosed between the outlet-end of each blade 1 and cylindrical surface 7. The aforementioned angles at the surface 6 are acute angles, whereas the aforementioned angles at the surface 7 are about 90 degrees.

The toroidal filter insert F is arranged in a filter housing 11 provided with a cover 12. Cover 12 defines a port 12a for the admission of fluid to be filtered, or purified, into housing 11. Housing 11 defines a port 13 for draining filtered or purified fluid from housing 11. Housing 11 further defines a port 14 for removing foreign matter not allowed to pass through the filter. Port 14 is normally plugged by a hexagon plug-screw 30. The filter insert F is arranged between, and supported by, spaced discs 15, 16 forming an integral part of the filter insert F. The path of liquid to be filtered and of filtered liquid has been indicated diagrammatically by arrows 23, 24 and 25. The flow of fluid is, therefore, generally radially inwardly from the inlet-surface 6 of relatively large diameter to the outlet surface 7 of relatively small diameter. The filtered fluid flows through apertures 16a provided in disc 16 into the passage 13 defined by housing 11. Shaft 17 is provided with a manual operator 17a such as a handle or a hand wheel, and discs 15 and 16 are secured at 15b and 16b to shaft 17, thus being jointly rotatable with shaft 17. Cover 12 is provided with a stuffing box 12b to preclude fluid from leaking along shaft 17 out of housing 11. The inner cylindrical surface of casing 11 supports a scraper 28 which is generally in the shape of a helix and extends from the level of the uper ends of elements or blades 1 to the level of the lower ends thereof. Reference numeral 29 has been applied to indicate a space intended for collecting foreign matter preparatory to its removal through port 14. Space 29 is situated at the bottom of a helical path 31 defined by the inner surface of housing 11, the radially outer surface 6 of filter insert F and the helical scraper 28.

Foreign matter in the form of solid particles of various sizes are being collected along the cylindrical surface 6 in the aforementioned cylindrical duct or path 31. Rotation of handle 17a, shaft 17 and insert F in the direction of arrow 27 causes movement of foreign matter along helical duct or path 31 in the direction toward collecting space 29 where such matter is being deposited. If desired, housing 11 may be provided with a plurality of helical scrapers, instead of but one such scraper.

It will be apparent from FIGS. 9 and 10 that each of the blades 1 of this structure has a surface formed by a vertical generatrix, and that the constituent blades 1 of the sieve stack are arranged in a circular pattern around a vertical axis parallel to the vertical generatrix of each of the surfaces of blades 1.

Referring now to FIGS. 11 to 14, the structures shown therein are generally similar to the structure of FIGS. 1 to 2 and have most of the features thereof. The structures shown in FIGS. 11 to 14 comprise a plurality of blades 1 stacked betwen terminal blocks 1d, 1e. Studs S project transversely across blades 1 and blocks 1d, 1e integrating these parts into a self-sustained structural unit. As shown in FIGS. 11 and 12 a helical spring P is mounted on each of studs S, tending to compress the stack of blades 1 and imparting a certain resiliency or give to it. It will be noted that studs S extend through blades 1 in the region of the outlet plane 7 or remote from the inlet plane 6 of the sieve or filter. The curved blades 1 shown in FIGS. 11–14 define passages 1a between contiguous blades which have substantially the same geometry as disclosed in conection with FIGS. 1 to 2, i.e. increase in cross-sectional area from the inlet-plane 6 toward the outlet plane 7. The individual blades or laminations 1 shown in FIGS. 11–14 differ somewhat from those shown in FIGS. 1 to 2, their shape being more clearly shown in FIG. 15.

The structure shown in FIGS. 16 and 17 is, in essence, the same as shown in FIGS. 7 and 8 and described in connection therewith. The geometry of the cross-sectional profile of the individual laminations or blades of the structure of FIGS. 16 and 17 is, in essence, the same as shown in FIGS. 11–15. As shown in FIGS. 16 and 17 the circular disc-shaped elements 1 are clamped between two terminal blocks 1d, 1e and clamped together by means of transverse studs S. The relatively narrow inlets 1a' are situated inside of a cylindrical surface 6 of relatively small diameter and the relatively wide outlet openings 1a" are situated inside of the cylindrical surface 7 of relatively large diameter. Cup-shaped scraper 8 has an edge increment 8a situated in the cylindrical inlet plane 6 and is associated with means (not shown) enabling a rectilinear movement of scraper 8 in the direction of the arrow 9. The spacing ribs 2 are arranged at right angles to the general plane of discs 1 and define therebetween the six fluid passages 1a.

It will be understood that where, in the foregoing, such terms as relatively narrow inlets, or relatively wide outlets, have been used, relatively wide or narrow has reference to the size of the inlet and outlet orifices, respectively.

It is desirable to provide means at the relatively narrow inlets 1a' which facilitate the flow of fluid into the inlets. The inlet-plane-ends of elements 1 should preferably be surface treated to form capillary fluid entrances thereon. Such capillaries ought to be formed on elements 1 immediately adjacent inlet-plane 6, and their suction effect facilitates penetration of liquids into the curved passages 1a. The fine grooves in elements 1 required for producing an intense capillary action at the inlet regions of passages 1a may be formed by rolling the stock of which elements 1 are made through appropriate rolls, by appropriate blast treatment of elements 1, treating the inlet ends of elements 1 with wire brushes, et cetera.

Elements, blades or laminations 1 may be made of resilient steel but there are also other known materials of which these parts may be made depending upon the particular application in hand.

The filters or sieves embodying this invention are primarily intended for filtering or purifying liquid media but lend themselves in many instances also for filtering or purifying gaseous media.

It will be understood that some parts which are essential elements of this invention have been omitted in some of the figures, or only diagrammatically shown therein, but such parts have been fully shown in other figures. Thus the scraper has been only shown in FIGS. 2, 4, 9 and 10, but all embodiments of the invention are intended to be provided with a scraper. In FIGS. 1a, 2, etc. no support means for integrating the constituent blades 1 into a unitary sieve structure have been shown. In all embodiments of the invention the constituent sieve blades, or equivalents thereof are, however, associated with means for integration of these parts into unitary sieve structures, preferably stud means of the kind shown in FIGS. 11–14, and described in connection therewith. Other means than studs may be used for integrating the sieve blades, or equivalents thereof, into a unitary sieve structure. Thus, in the embodiment of the invention shown in FIGS. 9 and 10 a pair of spaced discs 15, 16 is used as a means for integrating the sieve blades or laminations 1 into a unitary sieve structure. All embodiments of the invention are provided with element spacing means such as a spacing rib at the upstream end of the sieve structure. Reference character 2 has been applied to indicate such ribs in FIGS. 1, 1a, 5–8, etc. In other figures such as, for instance, FIGS. 2 and 4, ribs have been illustrated but not identified by reference characters.

It will be understood that I have illustrated and described herein preferred embodiments of the invention and that various alterations may be made in the details thereof without departing from the spirit and the scope of the invention as defined in the appended claims.

I claim:

1. A sieve for straining fluid media comprising a plurality of continuously bent laminations stacked in spaced relation to form a plurality of continuously bent fluid passages therebetween; said laminations being shaped to define passages having relatively narrow inlets and relatively wide outlets and progressively increasing in cross-section from said inlets to said outlets; said inlets being situated in a joint inlet-plane and said outlets being situated in a joint outlet-plane; each of said laminations enclosing at the inlet-plane-end thereof an angle with said inlet-plane different from the angle enclosed between each of said laminations at the outlet-plane-end thereof with said outlet-plane, said first mentioned angle being less than said last mentioned angle; the inlet-plane ends of said laminations being relatively free and the ends of said laminations adjacent said outlet-plane being clamped together by clamping means projecting transversely through said laminations; and means for removing foreign matter from the inlet-plane-end of said passages, said removing means including a scraper including a scraper edge and a blade, said edge being situated in said inlet-plane and said blade being shaped in such a fashion that each cross-section thereof taken along a section-plane at right angles to said inlet-plane is generally symmetrical with respect to said inlet-plane to a cross-section taken along said section-plane of the nearest end of one of said laminations, and said removing means further including means for moving said scraper relative to said narrow inlets in the direction of the curvature of the inlet-plane-ends of said laminations.

2. A sieve as specified in claim 1 comprising tie rods projecting transversely through said laminations at points thereof situated closer to said outlet-plane than to said inlet-plane.

3. A sieve as specified in claim 1 wherein each of said laminations includes spacer rib means forming an integral part thereof beginning at said inlet-plane end of said laminations and extending toward said outlet-plane-end thereof.

4. A sieve as specified in claim 1 wherein said inlet-plane is a cylinder having a relatively large diameter, wherein said outlet plane is a coaxial cylinder having a relatively small diameter and wherein said scraping edge is in the form of a helix.

5. A sieve as claimed in claim 1 wherein the ends of said laminations adjacent said inlet-plane are provided with capillary-forming indentations to produce a capillary suction action at said inlet-plane.

6. A sieve for straining fluid media comprising means defining a plurality of fluid passages having relatively narrow inlets situated in a common inlet-plane and having relatively wide outlets situated in a common outlet-plane; the ends of said passage-defining means adjacent said outlet-plane enclosing a predetermined angle with said outlet-plane, said passage defining means slanting progressively from said outlet-plane toward said inlet-plane, and the ends of said passage-defining means adjacent said inlet plane enclosing a predetermined acute angle with said inlet-plane; a scraper including a scraping edge situated in said inlet-plane and a blade enclosing with said inlet-plane an angle in the order of 360 degrees minus said predetermined acute angle; and means for moving said scraper with the edge thereof in engagement with said inlet-plane substantially in the direction of the slant of said passage-defining means.

7. A sieve for straining fluid media comprising a stack of spaced continuously curved laminations defining a plurality of continuously curved fluid passages having relatively narrow inlets situated in a common inlet-plane and having relatively wide outlets situated in a common outlet-plane; the ends of said laminations adjacent said outlet-plane enclosing an angle of approximately 90 degrees with said outlet-plane, said laminations slanting progressively from said outlet-plane toward said inlet-plane, and the ends of said laminations adjacent said inlet-plane enclosing a predetermined acute angle with said inlet-plane; a scraper including a scraper edge situated in said inlet-plane and a blade enclosing with said inlet-plane an angle in the order of 360 degrees minus said predetermined acute angle; and means for moving said scraper with the edge thereof in engagement with said inlet-plane substantially in the direction of the slant of said laminations.

8. A sieve for straining fluid media comprising a stack formed of spaced laminations having edges at opposite sides thereof and jointly defining a plurality of fluid passages; said edges on one side of said laminations defining a plurality of relatively narrow inlets situated in a common inlet-plane and said edges on the other side of said laminations defining a plurality of relatively wide outlets situated in a common outlet-plane; the ends of said laminations adjacent said outlet-plane enclosing with said outlet-plane an angle in the order of 90 degrees as seen in any one of a family of cross-sections taken at right angles to said outlet-plane; said laminations slanting progressively from said outlet-plane toward said inlet-plane, and the ends of said laminations adjacent said inlet-plane enclosing with said inlet-plane a predetermined acute angle as seen in any one of a family of cross-sections taken at right angles to said inlet-plane; a scraper including a scraping edge and a blade, said edge being situated in said inlet-plane and intersecting the edges of said laminations situated in said inlet-plane and having a predetermined inclination with respect to said edges, and said blade enclosing an angle in excess of 270 degrees with said inlet-plane as seen in any one of a family of cross-sections taken at right angles to said inlet-plane; and means for establishing relative movement between said inlet-plane and said scraper in the direction of the slant of said laminations.

9. A sieve for straining fluid media comprising a stack formed of spaced continuously curved laminations having edges on opposite sides thereof and jointly defining a plurality of continuously curved fluid passages; said edges on one side of said laminations defining a plurality of relatively narrow inlets situated in a common inlet-plane and said edges on the other side of said laminations defining a plurality of relatively wide outlets situated in a common outlet-plane; the ends of said laminations adjacent said outlet-plane enclosing with said outlet-plane an angle in the order of 90 degrees as seen in any one of a family of cross-sections taken at right angles to said outlet plane, said laminations slanting progressively from said outlet-plane toward said inlet-plane, and the ends of said laminations adjacent said inlet-plane enclosing with said inlet-plane a predetermined acute angle as seen in any one of a family of cross-sections taken at right angles to said inlet-plane; a scraper including a scraping edge and a blade, said edge being situated in said inlet-plane and intersecting the edges of said laminations situated in said inlet-plane and having a predetermined inclination with respect to said edges, and said blade enclosing an angle in excess of 270 degrees with said inlet-plane as seen in any one of a family of cross-sections at right angles to said inlet-plane; and means for establishing relative movement between said inlet-plane and said scraper in the direction of the slant of said laminations.

10. A sieve for straining fluid media comprising a stack formed of spaced annular continuously curved laminations defining continuously curved fluid passages; the radially inner edges of said laminations defining a plurality of relatively narrow inlets situated in a common inlet-plane and the radially outer edges of said laminations defining a plurality of relatively wide outlets situated in a common outlet-plane; the outlet ends of said lamination enclosing with said outlet-plane an angle in the order of 90 degrees as seen in any one of a family of radial cross-sections of said stack, said laminations slanting progressively from said outlet-plane toward said inlet-plane, and the inlet ends of said laminations enclosing with said inlet-plane a predetermined acute angle as seen in any one of a family of radial cross-sections of said stack; a scraper including an annular scraping edge and an annular blade, said edge being situated in said inlet-plane and said blade enclosing an angle in excess of 270 degrees with said inlet-plane as seen in any one of a family of radial cross-sections of said stack; and means for establishing relative movement between said scraper and said stack in a direction of the axis of said stack.

References Cited in the file of this patent

UNITED STATES PATENTS

| | | |
|---|---|---|
| 990,861 | Hamill | May 2, 1911 |
| 1,382,056 | Bontemps | June 21, 1921 |
| 1,757,153 | Thompson | May 6, 1930 |
| 1,926,557 | Perkins | Sept. 12, 1933 |
| 1,962,048 | Altpeter | June 5, 1934 |
| 1,987,142 | Clements | Jan. 8, 1935 |
| 2,008,598 | Seeley | July 16, 1935 |
| 2,029,611 | Chewning | Feb. 4, 1936 |
| 2,547,941 | Heftler | Apr. 10, 1951 |
| 2,601,521 | Heftler | June 24, 1952 |
| 2,699,261 | Britton | Jan. 11, 1955 |
| 2,767,851 | Muller | Oct. 23, 1956 |
| 2,804,210 | Shaughnessy | Aug. 27, 1957 |

FOREIGN PATENTS

| | | |
|---|---|---|
| 630,915 | France | Sept. 3, 1927 |
| 582,923 | Germany | Aug. 25, 1933 |
| 66,074 | Netherlands | July 15, 1950 |
| 687,967 | Great Britain | Feb. 25, 1953 |
| 907,166 | Germany | Mar. 22, 1954 |